(12) United States Patent
Sato

(10) Patent No.: US 9,052,487 B2
(45) Date of Patent: Jun. 9, 2015

(54) OPTICAL FIBER HOLDER

(75) Inventor: Ryuichiro Sato, Yokohama (JP)

(73) Assignee: SEI OPTIFRONTIER CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 14/004,185

(22) PCT Filed: Mar. 19, 2012

(86) PCT No.: PCT/JP2012/056990
§ 371 (c)(1),
(2), (4) Date: Sep. 10, 2013

(87) PCT Pub. No.: WO2012/140991
PCT Pub. Date: Oct. 18, 2012

(65) Prior Publication Data
US 2014/0003785 A1 Jan. 2, 2014

(30) Foreign Application Priority Data

Apr. 15, 2011 (JP) ................................. 2011-091130

(51) Int. Cl.
*G02B 6/00* (2006.01)
*G02B 6/44* (2006.01)
*G02B 6/36* (2006.01)
*G02B 6/255* (2006.01)

(52) U.S. Cl.
CPC ............ *G02B 6/4439* (2013.01); *G02B 6/3616* (2013.01); *G02B 6/3636* (2013.01); *G02B 6/2555* (2013.01)

(58) Field of Classification Search
CPC .. G02B 6/2553; G02B 6/3616; G02B 6/3636; G02B 6/3652; G02B 6/3802; G02B 6/3803; G02B 6/3648
USPC .......................................... 385/137, 134, 136
See application file for complete search history.

(56) References Cited

U.S. PATENT DOCUMENTS 7,103,253 B2 * 9/2006 Mizuno et al. ................ 385/134
7,519,260 B1 * 4/2009 Lin et al. ....................... 385/136

FOREIGN PATENT DOCUMENTS

| JP | H07-218753 A | 8/1995 |
| JP | 2003-177267 A | 6/2003 |
| JP | 2007-298705 A | 11/2007 |

* cited by examiner

*Primary Examiner* — Ryan Lepisto
*Assistant Examiner* — Robert Tavlykaev
(74) *Attorney, Agent, or Firm* — Drinker Biddle & Reath LLP

(57) ABSTRACT

An optical fiber holder 21 includes an alignment mechanism part 51 having a base part 52 formed in a holder body 22, a movable base part 53 arranged on the base part 52, and an alignment lid 54 arranged on the movable base part 53. A slit 61 capable of receiving parallel-arranged plural optical fiber core wires 11 is formed between the movable base part 53 and the alignment lid 54 in the superposed state. By turning the movable base part 53 and the alignment lid 54 to the side of the base part 52, the optical fiber core wires 11 received in the slit 61 are aligned in a receiving groove 23 formed in the holder body 22.

5 Claims, 8 Drawing Sheets

OPTICAL FIBER HOLDER

TECHNICAL FIELD

The present invention relates to an optical fiber holder for aligning and holding plural optical fibers.

BACKGROUND ART

There is known a holder for aligning and holding plural single-core optical fibers. Specifically, there is known a holder for inserting four single-core optical fiber core wires from a gap between a lower surface of a first clamp and a flat bottom surface of a first groove part formed in a first base part into the first groove part, thereby holding the four optical fiber core wires at the first groove part such that they mutually contact and they are parallel (for example, see Patent Reference 1).

PRIOR ART REFERENCE

Patent Reference

Patent Reference 1: JP-2007-298705-A

DISCLOSURE OF THE INVENTION

Problems that the Invention is to Solve

In the above-described holder, the optical fiber core wires are inserted into the first groove part by being sequentially slid from the gap between the lower surface of the first clamp and the bottom surface of the first groove part. However, the edge of the first groove part is projected upwardly at another place in an axial direction of the holder. Accordingly, it is necessary to slide the optical fiber core wires while curving them to avoid the projected portion. As a result, workability of inserting the optical fiber core wires into the first groove part and aligning and holding them is not good.

An object of the invention is to provide an optical fiber holder capable of improving workability of aligning and holding plural optical fibers.

Means for Solving the Problems

An aspect of the invention provides an optical fiber holder including:
a holder body, and
an alignment mechanism part having
a base part formed in the holder body,
a movable base part disposed on the base part, and
an alignment lid disposed on the movable base part,
wherein each of the movable base part and the alignment lid is turnably coupled to the holder body around the same shaft line, and
wherein a slit is formed between the movable base part and the alignment lid in a superposed state, such that a side opposite to a side where the movable base part and the alignment lid are coupled to the holder body is opened, the slit being capable of receiving plural parallel-arranged optical fibers, and
wherein, by turning the movable base part and the alignment lid in the superposed state so as to be covered on the base part, the plural optical fibers received in the slit are aligned in a receiving part formed in the holder body.

There may be provided the optical fiber holder,
wherein at least one of the movable base part and the alignment lid has a protrusion which narrows an opening width of the slit at a part of the opened side opposite to the coupled side.

There may be provided the optical fiber holder,
wherein a holding lid is provided on a lateral part of the alignment mechanism part so as to be turnably coupled to the holder body around the same shaft line with a rotational shaft for the movable base part and the alignment lid and to thereby press and hold the optical fibers aligned in the receiving part of the holder body, and
wherein a stopping turning angle of the movable base part and the alignment lid with respect to the holder body is smaller than a stopping turning angle of the holding lid with respect to the holder body.

There may be provided the optical fiber holder,
wherein an attraction between the base part and the movable base part and an attraction between the movable base part and the alignment lid are generated, respectively, and
wherein an attraction force between the movable base part and the alignment lid is set weaker than an attraction force between the base part and the movable base part.

There may be provided the optical fiber holder,
wherein a magnet having a magnetic force is provided to thereby generate the attraction between the base part and the movable base part and the attraction between the movable base part and the alignment lid.

Advantage of the Invention

According to the invention, the plural optical fibers are sequentially inserted and received from an opening portion of the slit to the slit formed by the movable base part and the alignment lid, and the movable base part and the alignment lid are covered on the base part of the holder body and thereby, the plural optical fibers received in the slit can easily be aligned in the receiving part of the holder body. Accordingly, workability of aligning the plural optical fibers in order to perform terminal processing or fusion splicing processing can be improved greatly.

Particularly, the movable base part and the alignment lid in the superposed state are turned and an opening of the slit is set upwardly and the optical fibers are inserted from the opening portion of the slit and thereby, the plural optical fibers can be received in a parallel aligned state so as to naturally laminate the plural optical fibers sequentially from the back side of the slit.

MODE FOR CARRYING OUT THE INVENTION

An example of an embodiment of an optical fiber holder according to the invention will hereinafter be described with reference to the drawings.

The optical fiber holder of the present embodiment is a holder for aligning and holding plural single-core optical fibers. In addition, an optical fiber core wire in which the outer periphery of a glass fiber made of a core and cladding is coated with a resin will be illustrated and described as an optical fiber.

Figure 1:
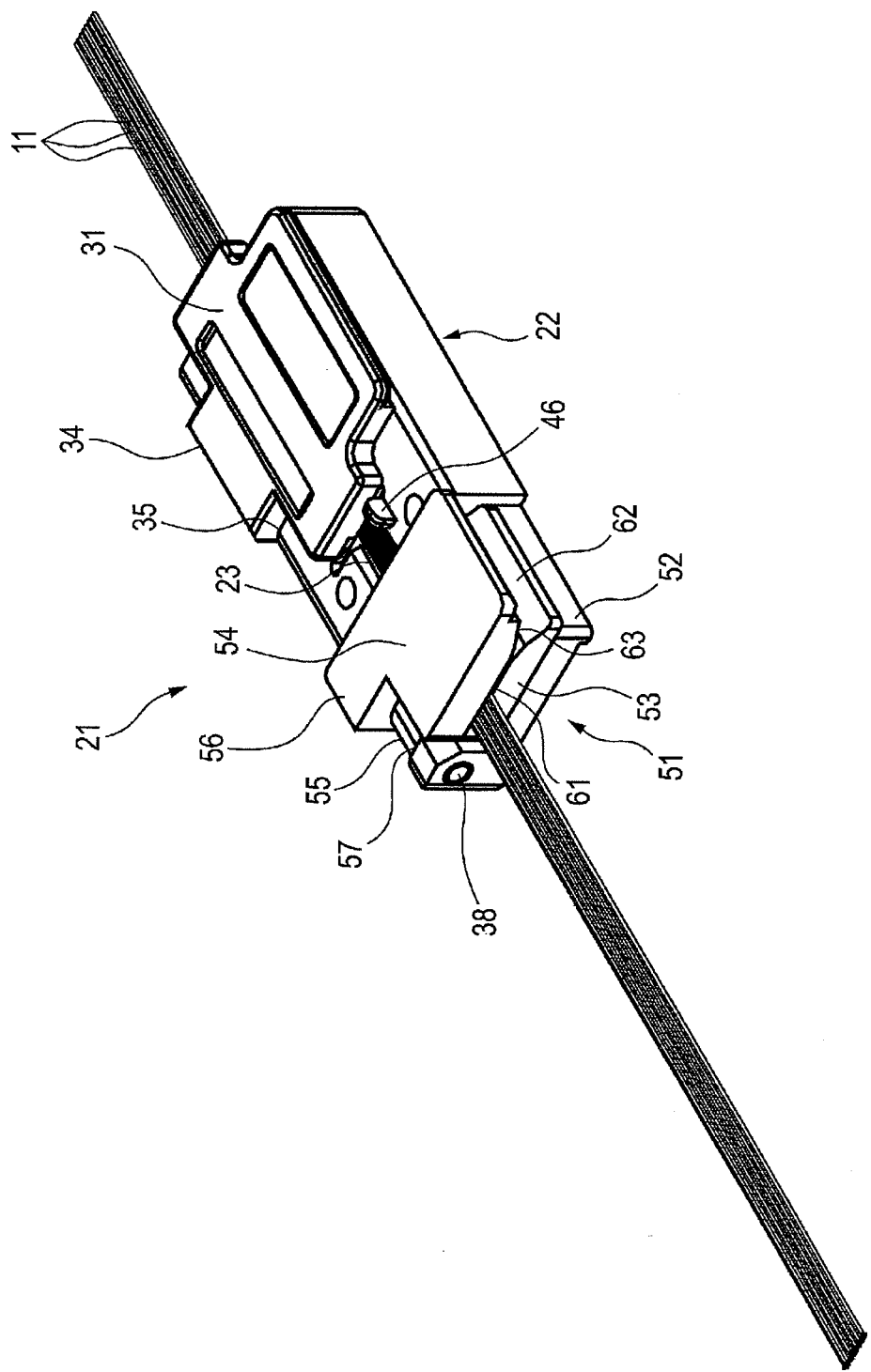
[FIG. 1] A perspective view showing one embodiment of an optical fiber holder according to the invention.
Figure 2A:
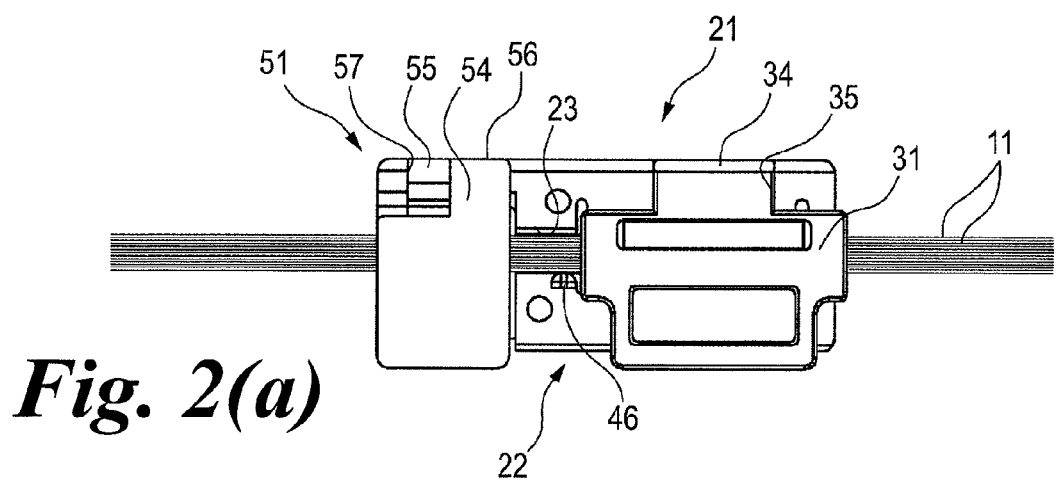
[FIG. 2(a)] A plan view showing the optical fiber holder of FIG. 1.
Figure 2B:
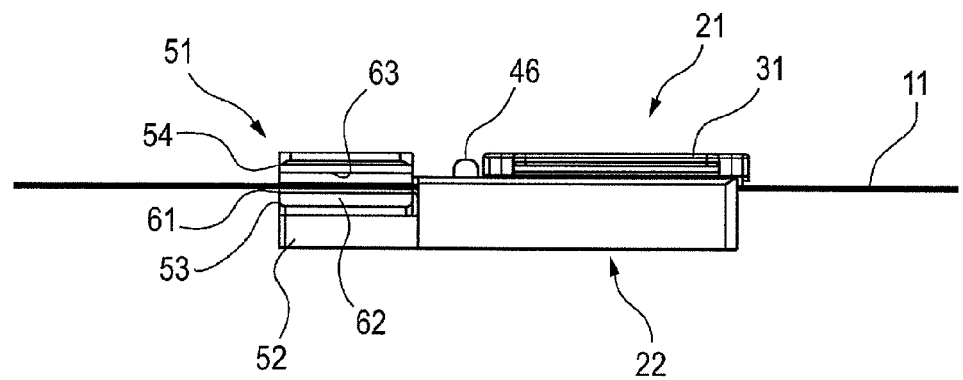
[FIG. 2(b)] A side view showing the optical fiber holder of FIG. 1.
Figure 2C:
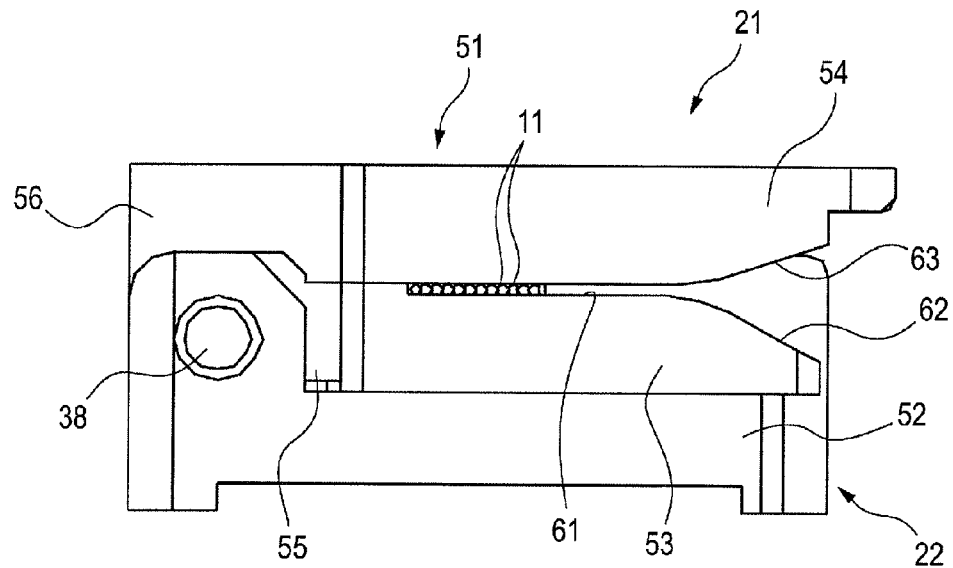
[FIG. 2(c)] A side view seen from the side of an alignment mechanism part showing the optical fiber holder of FIG. 1.

As shown in FIGS. 1 to 2(c), an optical fiber holder 21 holds plural (twelve in the present example) single-core optical fiber core wires (optical fibers) 11 with an outside diameter of 250 μm. This optical fiber holder 21 is a holder for aligning and holding the plural optical fiber core wires 11 when coatings of ends of the plural optical fiber core wires 11 are removed and glass fibers with an outside diameter of 125 μm are exposed and the glass fibers are cut in a predetermined position. Also, this optical fiber holder 21 can set the optical fiber core wires 11 in a fusion splicer with the optical fiber core wires 11 held when end faces of the glass fibers exposed to the ends of the optical fiber core wires 11 are mutually fused by the fusion splicer.

Figure 3:
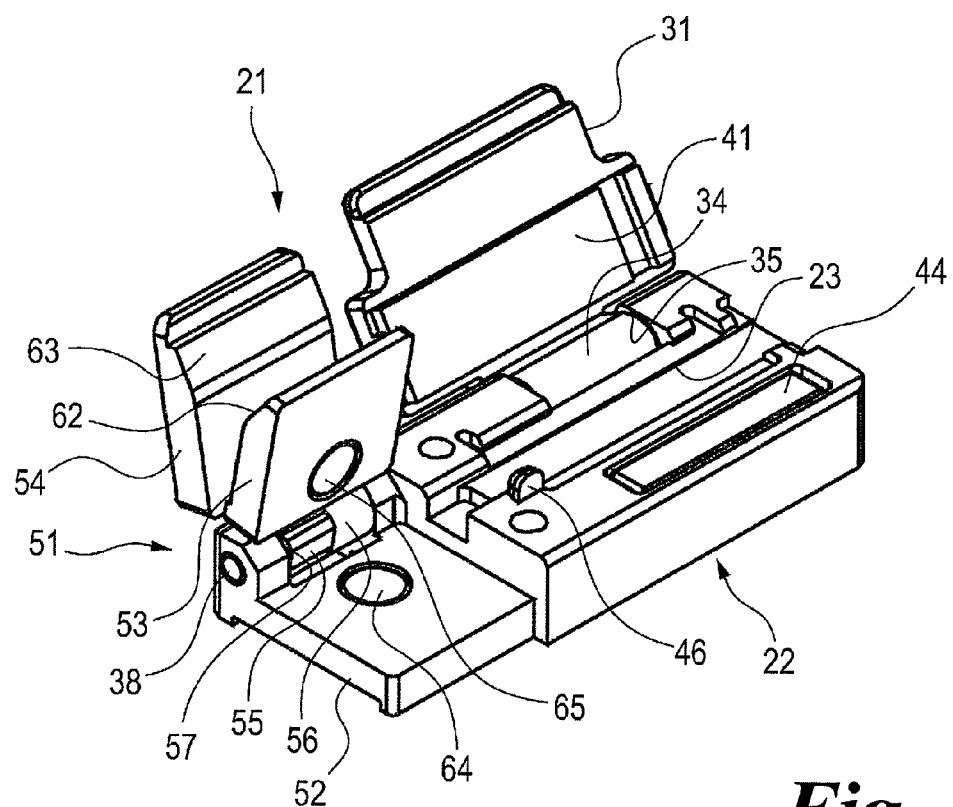
[FIG. 3] A perspective view showing a structure of the optical fiber holder of FIG. 1.
Figure 4:
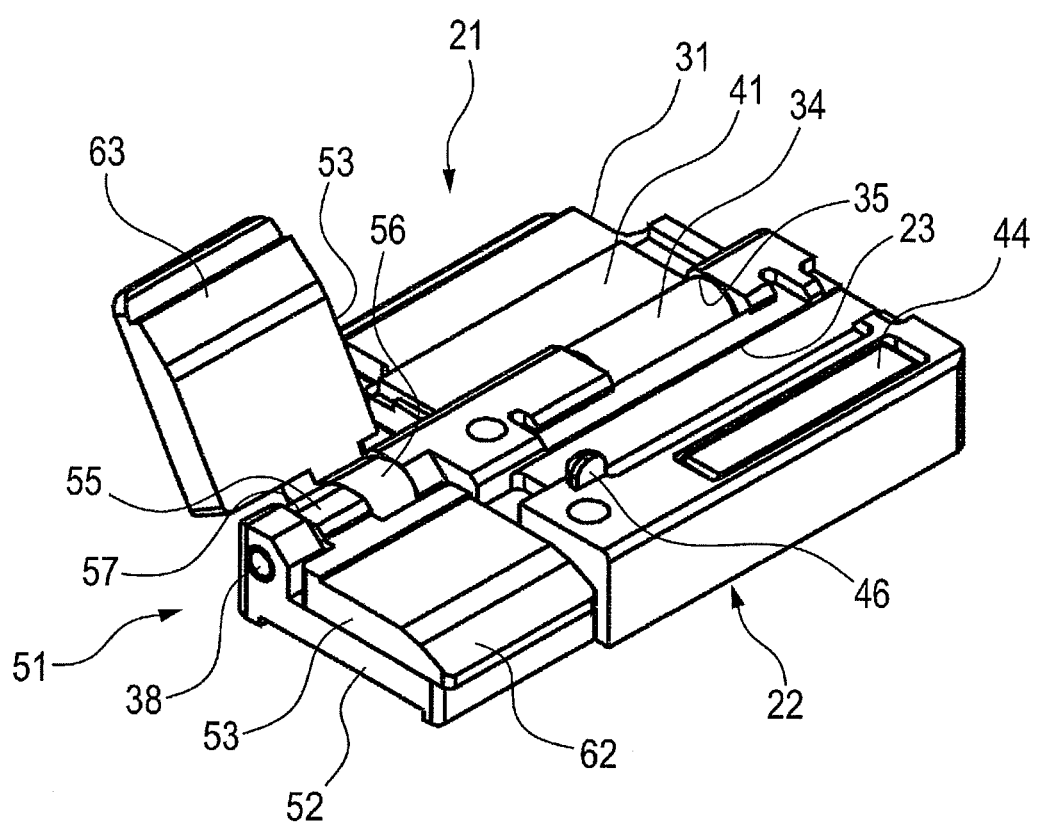
[FIG. 4] A perspective view showing a structure of the optical fiber holder of FIG. 1.

As shown in FIGS. 3 and 4, the optical fiber holder 21 has a holder body 22. An upper surface of the holder body 22 is formed with a receiving groove (receiving part) 23 for receiving the plural parallel-arranged optical fiber core wires 11 along an axial direction. On one lateral part of the holder body 22, a core wire holding lid (holding lid) 31 is provided. The core wire holding lid 31 has a hinge part 34, and this hinge part 34 is disposed in a holding groove 35 formed in the holder body 22. Also, in the holder body 22, a coupling pin 38 is provided to extend through the holding groove 35. The coupling pin 38 is inserted into an insertion hole (not shown) formed in the hinge part 34. Accordingly, the core wire holding lid 31 is coupled to the holder body 22 turnably in the range of about 180° around a shaft line of the coupling pin 38. The upper surface of the holder body 22 is opened and closed by turning this core wire holding lid 31. Then, the core wire holding lid 31 is arranged so as to cover an upper part of the receiving groove 23 by being turned toward the upper surface side of the holder body 22.

The core wire holding lid 31 has a press plate part 41 made of an elastic material such as rubber on a surface facing the holder body 22. Then, the press plate part 41 is arranged in the upper part of the receiving groove 23 by turning the core wire holding lid 31 toward the upper surface side of the holder body 22.

The holder body 22 has a magnet 44 on an upper surface in the side opposite to one lateral part to which the core wire holding lid 31 is coupled, and this core wire holding lid 31 is constructed so as to make contact with or come close to the magnet 44 when the core wire holding lid 31 is arranged on the upper surface of the holder body 22. The core wire holding lid 31 is formed of a magnetic substance such as iron, and is attracted by a magnetic force of the magnet 44 with the core wire holding lid 31 arranged on the upper surface of the holder body 22. Thus, in the optical fiber holder 21, the core wire holding lid 31 is attracted to the holder body 22 by the magnetic force of the magnet 44 so as to press and hold the optical fiber core wires 11 of the inside of the receiving groove 23.

Also, a guide part 46 is projected in a position in which the core wire holding lid 31 on the upper surface of the holder body 22 does not overlap. This guide part 46 is formed on the edge of the receiving groove 23 in the side opposite to the side of coupling between the core wire holding lid 31 and the holder body 22.

The optical fiber holder 21 includes an alignment mechanism part 51 in one end side. This alignment mechanism part 51 has a plate-shaped base part 52 made of a part of the holder body 22. This base part 52 is formed in one end side of the holder body 22, and a movable base part 53 and an alignment lid 54 are covered on this base part 52. The movable base part 53 and the alignment lid 54 respectively have hinge parts 55, 56, and these hinge parts 55, 56 are disposed in a holding groove 57 formed in the holder body 22. The coupling pin 38 extends through the holding groove 57 so as to be inserted also into insertion holes (not shown) formed in the hinge parts 55, 56. Accordingly, the movable base part 53 and the alignment lid 54 are turnably coupled to the holder body 22 around the shaft line of the coupling pin 38.

A turning angle of the alignment lid 54 with respect to the holder body 22 is set at about 100° to 120° smaller than 180° which is a turning angle of the core wire holding lid 31 with respect to the holder body 22, and the alignment lid 54 butts against the holder body 22 and thereby, a turn of the alignment lid 54 in an open direction is regulated and the alignment lid 54 is stopped in a butting position. Also, a turning angle of the movable base part 53 with respect to the holder body 22 is set at about 100° to 120° smaller than 180° which is the turning angle of the core wire holding lid 31 with respect to the holder body 22, and the movable base part 53 butts against the alignment lid 54 in an opened state and thereby, a turn of the movable base part 53 in an open direction is regulated and the movable base part 53 is stopped in a butting position. In addition, the turning angles of the movable base part 53 and the alignment lid 54 are not limited to the above-described angles, and have only to be an angle smaller than the turning angle of the core wire holding lid 31. That is, when the turning angle of the core wire holding lid 31 with respect to the holder body 22 is larger than 180°, the turning angles of the movable base part 53 and the alignment lid 54 may be 180°.

Figure 5:
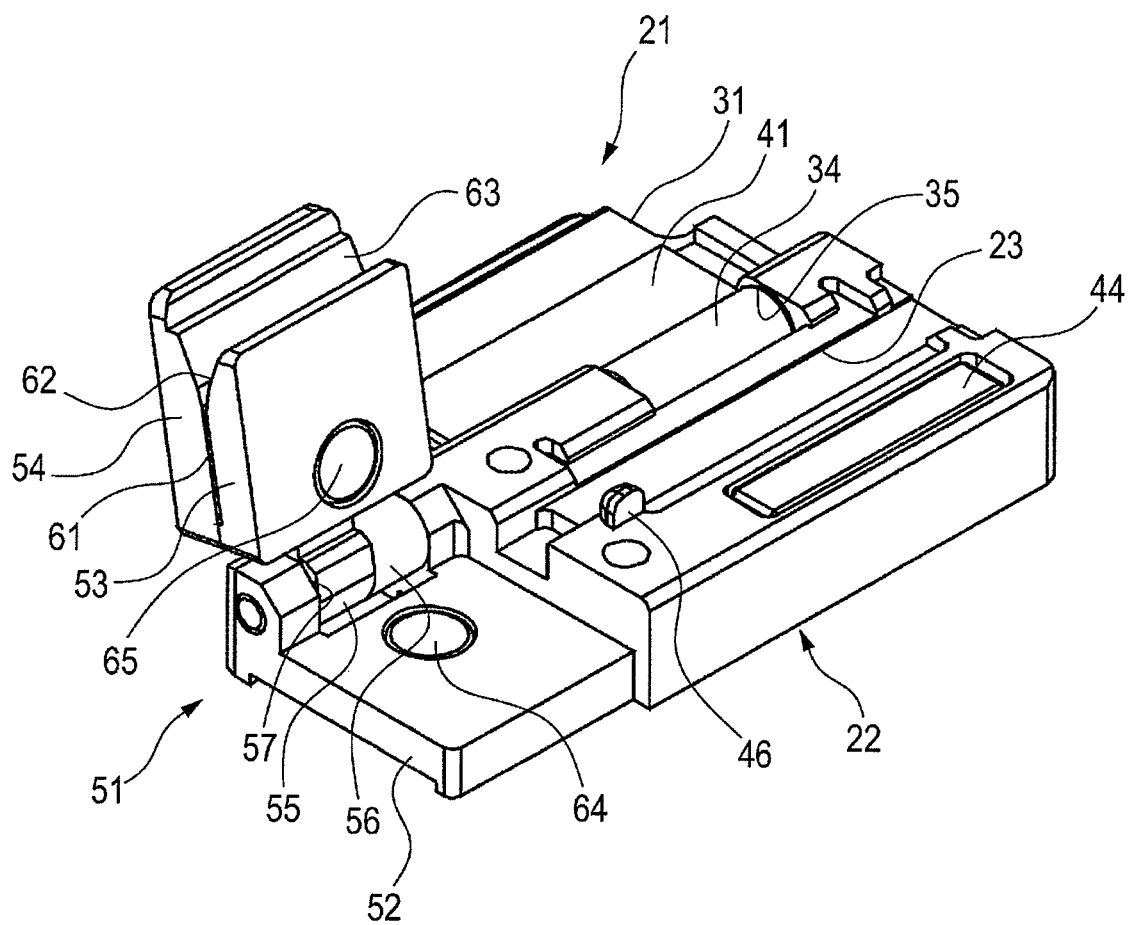
[FIG. 5] A perspective view showing a structure of the optical fiber holder of FIG. 1.
Figure 6:
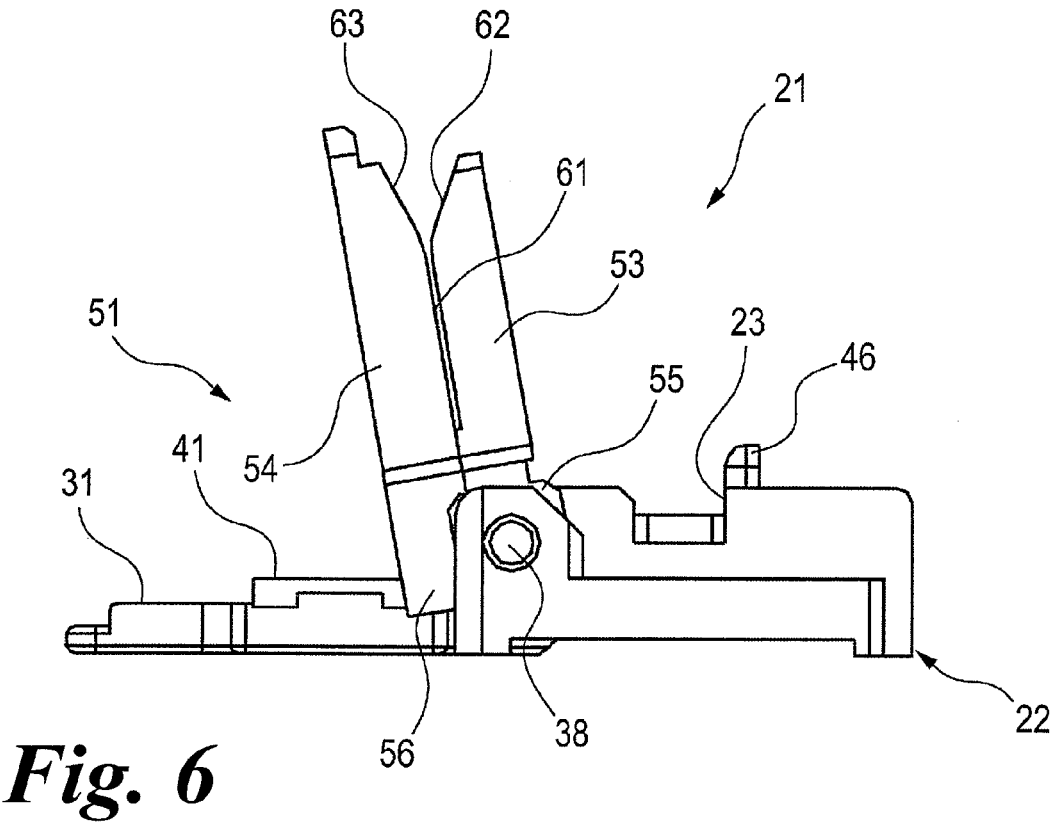
[FIG. 6] A side view seen from the side of an alignment mechanism part showing a structure of the optical fiber holder of FIG. 1.

As shown in FIGS. 5 and 6, in a state in which the movable base part 53 and the alignment lid 54 are superposed, while their facing surfaces mutually abut at sides being coupled to the holder body 22, a slit 61 is formed between their facing surfaces at the opposite sides thereto. Also, facing surfaces of the movable base part 53 and the alignment lid 54 are respectively formed with a taper surface 62 (first taper surface) and a taper surface 63 (second taper surface) such that a distance therebetween increases as they become distant from the sides being coupled to the holder body 22 beyond the slit 61. The slit 61 formed between the facing surfaces of the movable base part 53 and the alignment lid 54 has a width dimension slightly larger than an outside diameter of the optical fiber core wire 11, and the plural (twelve) optical fiber core wires 11 can be sequentially inserted from the lateral edge side of this slit 61. When the optical fiber core wires 11 are inserted into this slit 61, the optical fiber core wires 11 are smoothly guided to the slit 61 by the taper surfaces 62, 63. Then, when the plural optical fiber core wires 11 are sequentially inserted into the slit 61, these optical fiber core wires 11 are received inside the slit 61.

A magnet 64 is provided on an upper surface of the base part 52, and a magnet 65 is provided on a surface of the movable base part 53 at a side of the base part 52. Accordingly, the movable base part 53 is attracted to the base part 52 by a magnetic force of the corresponding magnets 64, 65 in a state in which the movable base part 53 is arranged on the upper surface of the base part 52.

The movable base part 53 is formed of a non-magnetic substance such as aluminum. Also, the alignment lid 54 is formed of a magnetic substance such as iron. Then, when the movable base part 53 and the alignment lid 54 are superposed, the alignment lid 54 is pulled to the movable base part 53 by a magnetic force of the magnet 65 provided for the movable base part 53, and the alignment lid 54 is attracted to the movable base part 53. In addition, the magnetic force of the magnet 65 acting on the alignment lid 54 indirectly acts through the movable base part 53 made of the non-magnetic substance. Consequently, an attraction force of the alignment lid 54 attracted to the movable base part 53 by the magnetic force of the magnet 65 becomes weaker than an attraction force in which the movable base part 53 is attracted to the base part 52 by the magnetic force of the corresponding magnets 64, 65.

Next, the case of aligning and holding the plural optical fiber core wires 11 in the optical fiber holder 21 with the above structure will be described.

When the plural optical fiber core wires 11 are aligned and held in the optical fiber holder 21, the core wire holding lid 31 is first turned and the upper surface side of the holder body 22 is opened. Also, the movable base part 53 and the alignment lid 54 of the alignment mechanism part 51 in the superposed state. This changes to a state in which the opening side of the slit 61 formed between the movable base part 53 and the alignment lid 54 is set upwardly (see FIGS. 5 and 6).

In this state, the optical fiber core wires 11 are inserted one by one so as to be slid into the slit 61 from the upward side. At this time, the optical fiber core wires 11 are smoothly guided to the slit 61 by the taper surfaces 62, 63. Then, only by inserting the plural optical fiber core wires 11 into the slit 61, the plural optical fiber core wires 11 are received inside the slit 61 in a parallel aligned state so as to naturally laminate the plural optical fiber core wires 11 sequentially from the back side of the slit 61 as shown in FIG. 7(*a*).

Figure 7A:
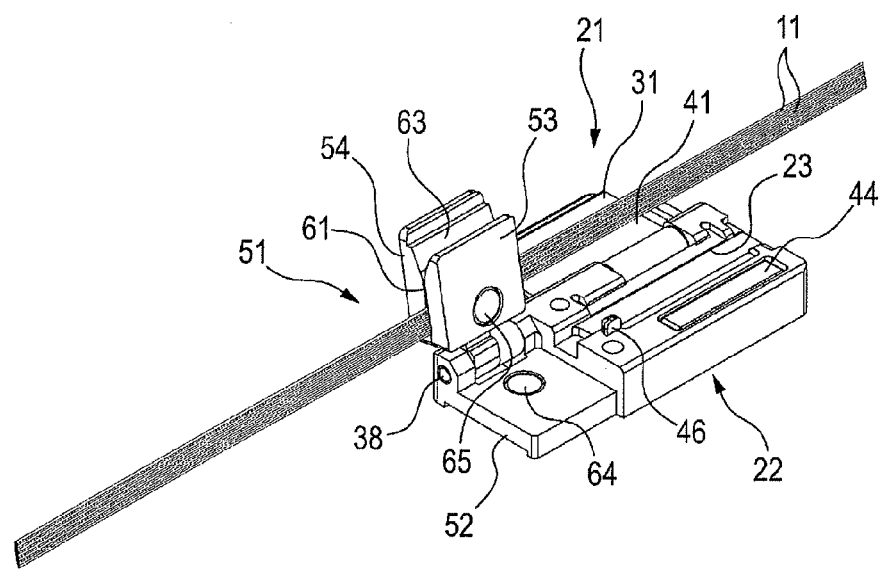
[FIG. 7(a)] A perspective view showing alignment holding work of optical fiber core wires by the optical fiber holder of FIG. 1.
Figure 7B:
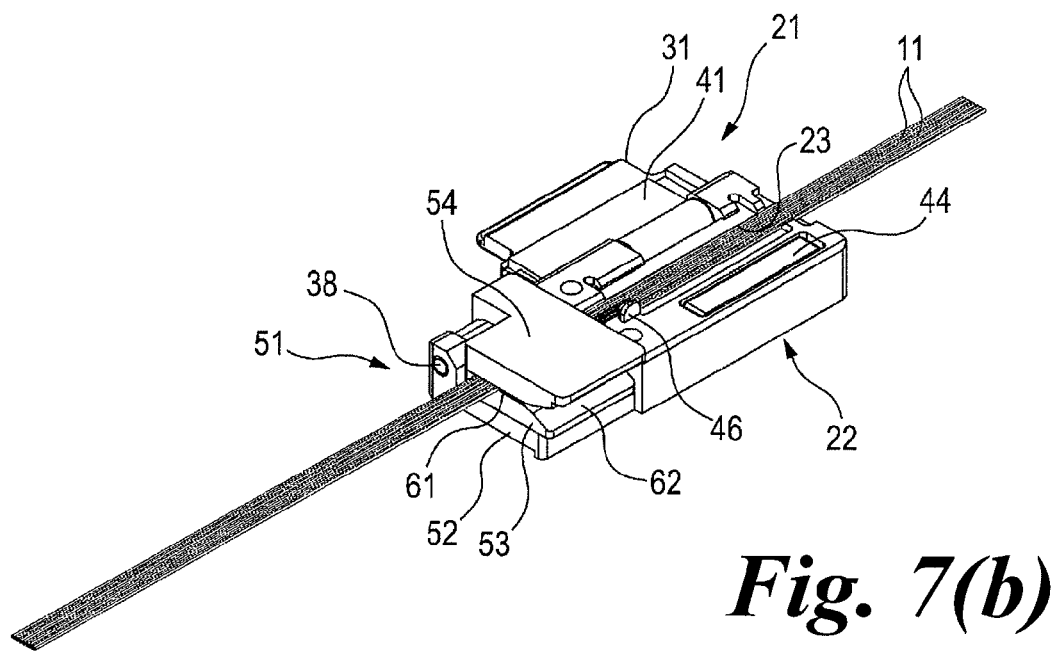
[FIG. 7(b)] A perspective view showing alignment holding work of the optical fiber core wires by the optical fiber holder of FIG. 1.
Figure 7C:
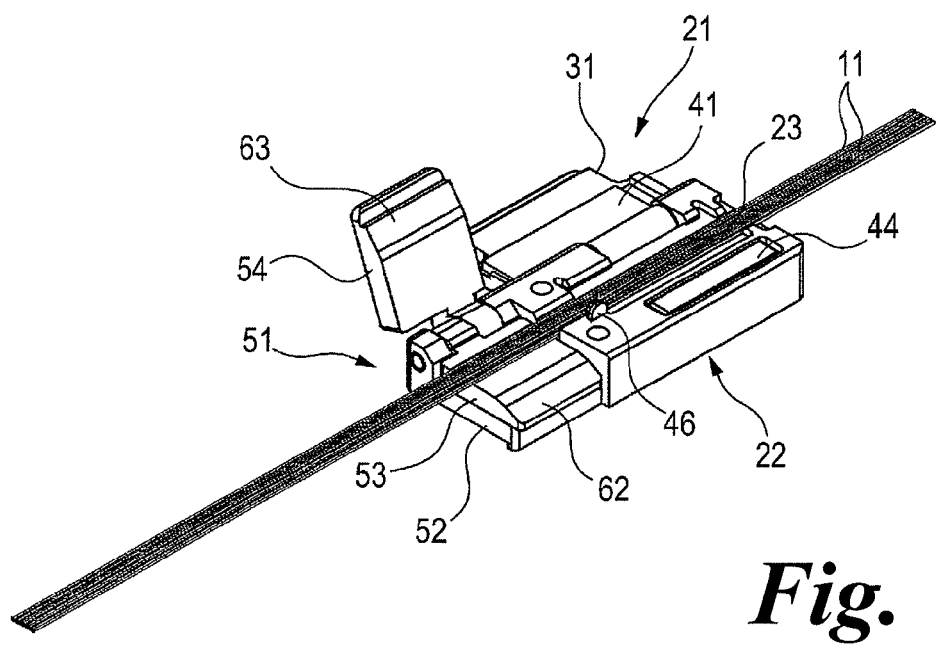
[FIG. 7(c)] A perspective view showing alignment holding work of the optical fiber core wires by the optical fiber holder of FIG. 1.

Next, as shown in FIG. 7(*b*), the movable base part 53 and the alignment lid 54, which are superposed so as to form the slit 61, are turned so as to be covered on the base part 52. Then, the magnets 64, 65 of the base part 52 and the movable base part 53 are mutually attracted. Accordingly, the movable base part 53 and the alignment lid 54 are held in the base part 52. At this time, the core wire holding lid 31 having the turning angle larger than the turning angles of the movable base part 53 and the alignment lid 54 with respect to the holder body 22 is in an opened state, so that the movable base part 53 and the alignment lid 54 can be turned without causing the optical fiber core wires 11 received in the slit 61 to interfere with the core wire holding lid 31.

When both of the movable base part 53 and the alignment lid 54 are covered on the base part 52 and are held thus, the plural optical fiber core wires 11 received in the slit 61 in a parallel aligned state are received inside the receiving groove 23 of the holder body 22. At this time, the plural optical fiber core wires 11 received inside the slit 61 are guided to the receiving groove 23 without protruding from the slit 61 by the guide part 46 formed on the edge of the receiving groove 23.

When the plural optical fiber core wires 11 are received in the receiving groove 23 thus, the core wire holding lid 31 is turned so as to be covered on an upper surface of the holder body 22. When the optical fiber core wires 11 of the inside of the receiving groove 23 are not arranged in line at this time, the optical fiber core wires 11 of the inside of the receiving groove 23 are leveled with a finger and are arranged in line. When the core wire holding lid 31 is covered on the upper surface of the holder body 22, the core wire holding lid 31 is attracted by the magnet 44 with the core wire holding lid 31 arranged on the upper surface of the holder body 22. Accordingly, the plural optical fiber core wires 11 are pressed and held by the press plate part 41 of the core wire holding lid 31.

By aligning and holding the plural optical fiber core wires 11 in the optical fiber holder 21 in this manner, terminal processing for removing a coating of the end and exposing a glass fiber or fusion splicing processing of mutual end faces of glass fibers by setting in a fusion splicer can smoothly be performed with respect to the optical fiber core wires 11.

When the optical fiber core wires 11 are taken out of the optical fiber holder 21, the core wire holding lid 31 is first turned and the upper surface side of the holder body 22 is opened. This releases holding of the optical fiber core wires 11 pressed and held on the holder body 22 by the core wire holding lid 31.

In this state, only the alignment lid 54 of the alignment mechanism part 51 is turned, and the alignment lid 54 is separated from the movable base part 53 as shown in FIG. 7(*c*). At this time, an attraction force in which the alignment lid 54 is attracted to the movable base part 53 by the magnetic force of the magnet 65 is weaker than an attraction force in which the movable base part 53 is attracted to the base part 52 by the magnetic force of the corresponding magnets 64, 65, so that only the alignment lid 54 can easily be turned without detaching the movable base part 53 from the base part 52.

Then, when the alignment lid 54 is turned and is separated from the movable base part 53, the slit 61 formed between the facing surfaces of the alignment lid 54 and the movable base part 53 is opened. Hence, the plural optical fiber core wires 11 received inside the slit 61 are exposed and the optical fiber core wires 11 can easily be taken out of the optical fiber holder 21.

According to the optical fiber holder 21 according to the above-described embodiment thus, the plural optical fiber core wires 11 are sequentially inserted and received from an opening portion of the slit 61 to the slit 61 formed by the movable base part 53 and the alignment lid 54, and the movable base part 53 and the alignment lid 54 are covered on the base part 52 and thereby, the plural optical fiber core wires 11 received in the slit 61 can easily be aligned in the receiving groove 23 of the holder body 22. Accordingly, workability of aligning the plural optical fiber core wires 11 in order to perform terminal processing or fusion splicing processing can be improved more than conventional workability.

In the above-described embodiment, the movable base part 53 and the alignment lid 54 in the superposed state can be turned to be stopped in a position in which an opening of the slit 61 is set upwardly, so that the optical fiber core wires 11 are inserted from the opening portion of the slit 61 and thereby, the plural optical fiber core wires 11 can be received in a parallel aligned state so as to naturally laminate the plural optical fiber core wires 11 sequentially from the back side of the slit 61.

While the optical fiber holder 21 has the core wire holding lid 31 for pressing and holding the optical fiber core wires 11 against and within the holder body 22, a function of holding the optical fiber core wires 11 may be given to the alignment mechanism part 51. For example, the alignment lid 54 may be displaceable with respect to the movable base part 53 in two stages of a slit formation position in which the slit 61 is formed and a fiber pinch position in which the optical fiber core wires 11 of the inside of the slit 61 are pushed on the movable base part 53 and are held.

Also, in the above-described embodiment, a holding force of the movable base part 53 on the base part 52 and a holding force of the alignment lid 54 on the movable base part 53 are produced by the attraction forces of the magnetic forces of the magnets 64, 65, but the holding force may be obtained by engaging means etc. using an elastic piece etc.

Figure 8:
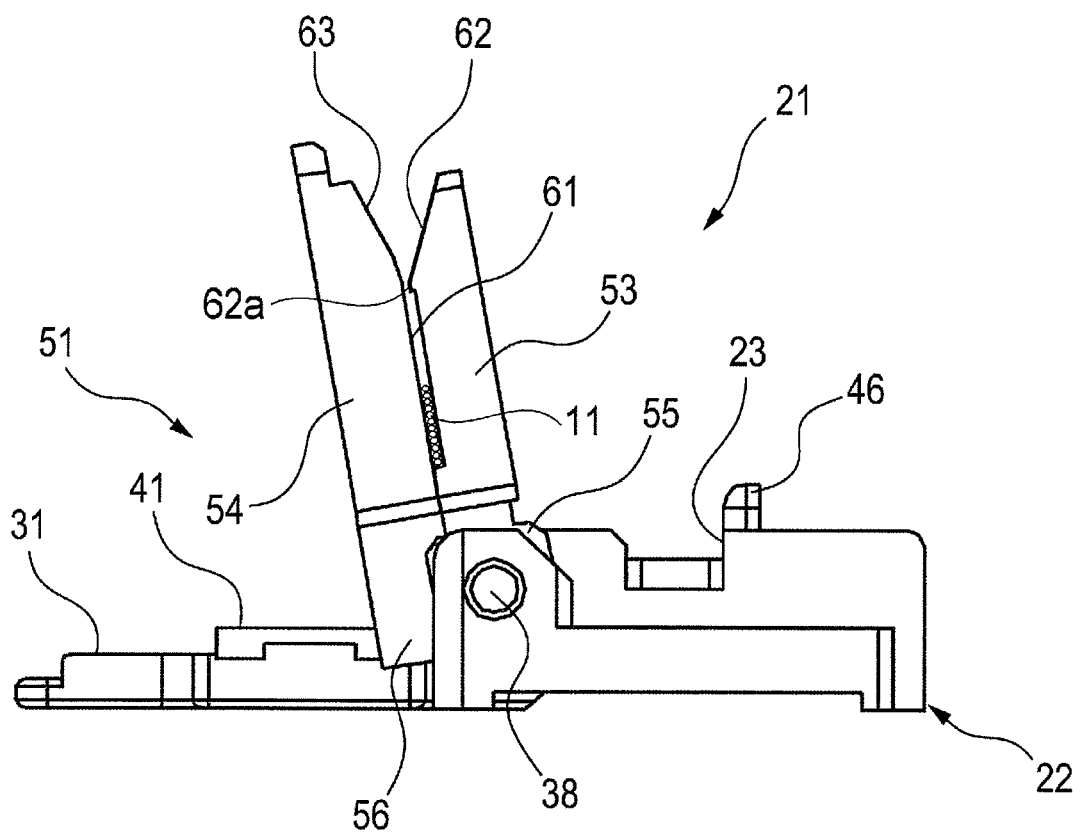
[FIG. 8] A side view seen from the side of an alignment mechanism part showing a modified example of the optical fiber holder of FIG. 1.

Further, FIG. 8 shows a modified example of the optical fiber holder 21 of the embodiment. In the modified example shown in FIG. 8, a protrusion 62a is provided on the movable base part 53 at a boundary between the slit 61 and the taper surface 6 so as to narrow an opening width of the slit 61 in an opening side opposite to the side being coupled to the holder body 22. The protrusion 62a can also be formed on the whole edge of the boundary between the slit 61 and the taper surface 62 along an axial direction of the movable base part 53, or be formed on at least a part of the boundary. By forming this protrusion 62a, when the movable base part 53 and the alignment lid 54 are turned to the side of the base part 52, the plural optical fiber core wires 11 received in the slit 61 can be prevented from protruding from an opening of the slit 61, and workability is improved more.

In addition, the magnetic force of the magnet 65 acting on the alignment lid 54 indirectly acts through the movable base part 53 made of the non-magnetic substance, so that an attraction force of the alignment lid 54 attracted to the movable base part 53 is relatively weak. As a result, the slit 61 is widened by slightly opening a gap between the movable base part 53 and the alignment lid 54 and thereby, the optical fiber core wires 11 can be received in the slit 61 without being blocked by the protrusion 62a.

A height of the protrusion 62a is preferably set at about 100 µm. By setting the height of the protrusion 62a at about 100 µm, when the slit 61 is only widened slightly, the optical fiber core wires 11 can effortlessly be inserted into the slit 61 and also, the optical fiber core wires 11 received in the slit 61 can be prevented from protruding.

In the present modified example, the protrusion 62a which narrows a part of the opening width of the slit 61 is provided on the movable base part 53. However, the protrusion may be provided on the taper surface 63 of the alignment lid 54, or the protrusions may be provided on both of the taper surfaces 62, 63, respectively.

The present application is based on Japanese patent application (patent application No. 2011-091130) filed on Apr. 15, 2011, and the contents of the patent application are hereby incorporated by reference.

DESCRIPTION OF REFERENCE NUMERALS AND SIGNS

11: OPTICAL FIBER CORE WIRE (OPTICAL FIBER)
21: OPTICAL FIBER HOLDER
22: HOLDER BODY
23: RECEIVING GROOVE (RECEIVING PART)
31: CORE WIRE HOLDING LID
51: ALIGNMENT MECHANISM PART
52: BASE PART
53: MOVABLE BASE PART
54: ALIGNMENT LID
61: SLIT
64, 65: MAGNET

The invention claimed is:

1. An optical fiber holder comprising:
a holder body, and
an alignment mechanism part having
a base part formed in the holder body,
a movable base part disposed on the base part, and
an alignment lid disposed on the movable base part,
wherein each of the movable base part and the alignment lid is turnably coupled to the holder body around a same shaft line, and
wherein a slit is formed between the movable base part and the alignment lid in a superposed state, such that a side opposite to a side where the movable base part and the alignment lid are coupled to the holder body is opened, the slit being capable of receiving plural parallel-arranged optical fibers, and
wherein, by turning the movable base part and the alignment lid in the superposed state so as to be covered on the base part, the plural optical fibers received in the slit are aligned in a receiving part formed in the holder body.

2. The optical fiber holder of claim 1,
wherein at least one of the movable base part and the alignment lid has a protrusion which narrows an opening width of the slit at a part of the opened side opposite to the coupled side.

3. The optical fiber holder of claim 1,
wherein a holding lid is provided on a lateral part of the alignment mechanism part so as to be turnably coupled to the holder body around the same shaft line with a rotational shaft for the movable base part and the alignment lid and to thereby press and hold the optical fibers aligned in the receiving part of the holder body, and
wherein a stopping turning angle of the movable base part and the alignment lid with respect to the holder body is smaller than a stopping turning angle of the holding lid with respect to the holder body.

4. The optical fiber holder of claim 1,
wherein an attraction between the base part and the movable base part and an attraction between the movable base part and the alignment lid are generated, respectively, and
wherein an attraction force between the movable base part and the alignment lid is set weaker than an attraction force between the base part and the movable base part.

5. The optical fiber holder of claim 4,
wherein a magnet having a magnetic force is provided to thereby generate the attraction between the base part and the movable base part and the attraction between the movable base part and the alignment lid.

* * * * *